(12) United States Patent
Holzapfel et al.

(10) Patent No.: US 10,060,765 B2
(45) Date of Patent: Aug. 28, 2018

(54) OPTICAL POSITION-MEASURING DEVICE

(71) Applicant: DR. JOHANNES HEIDENHAIN GmbH, Traunreut (DE)

(72) Inventors: Wolfgang Holzapfel, Obing (DE); Christoph Lingk, Traunstein (DE); Ulrich Benner, Trostberg (DE); Johannes Trautner, Traunwalchen (DE)

(73) Assignee: DR. JOHANNES HEIDENHAIN GmbH, Traunreut (DE)

(*) Notice: Subject to any disclaimer, the term of this patent is extended or adjusted under 35 U.S.C. 154(b) by 0 days.

(21) Appl. No.: 15/615,877

(22) Filed: Jun. 7, 2017

(65) Prior Publication Data

US 2017/0370749 A1  Dec. 28, 2017

(30) Foreign Application Priority Data

Jun. 22, 2016 (DE) .................. 10 2016 211 150

(51) Int. Cl.
  *G01B 11/14* (2006.01)
  *G01D 5/26* (2006.01)
  (Continued)

(52) U.S. Cl.
  CPC .............. *G01D 5/26* (2013.01); *G01B 11/14* (2013.01); *G01D 5/28* (2013.01); *G01D 5/353* (2013.01); *G01D 5/347* (2013.01)

(58) Field of Classification Search
  CPC ........ G01B 11/14; G01B 11/002; G01B 7/30; G01B 11/02; G01B 11/24; G01B 9/02049;
  (Continued)

(56) References Cited

U.S. PATENT DOCUMENTS 4,275,296 A  6/1981  Adolfsson
5,251,012 A * 10/1993  Riegger ............. G01D 5/34723
                                                  33/707
(Continued)

FOREIGN PATENT DOCUMENTS

EP    0005798 A1   12/1979
EP    0470291 B1    2/1992
(Continued)

*Primary Examiner* — Michael P Stafira
(74) *Attorney, Agent, or Firm* — Leydig, Voit & Mayer, Ltd.

(57) ABSTRACT

An optical position-measuring device for determining the position of a first object relative to a second object movable relative to the first object along a measurement direction includes a scale with a measuring graduation connected to the first object and extending along the measurement direction. A scanner is connected to the second object and includes a fiber-optic array including optical fibers. The fiber-optic array is configured as a fiber-optic plate having an image-input face facing the scale and an image-output face facing the detector array. The fiber-optic array transmits a light pattern into a detection plane of the detector array. An interstitial medium is disposed between the image-output face of the fiber-optic plate and the detector array to ensure that an amount of deflection that the beams exiting the image-output face undergo on a path to the detector array is smaller than in a case without the interstitial medium.

14 Claims, 4 Drawing Sheets

(51) Int. Cl.
*G01D 5/353* (2006.01)
*G01D 5/28* (2006.01)
*G01D 5/347* (2006.01)

(58) Field of Classification Search
CPC ............ G01B 9/02055; G01B 9/02083; G01B 11/00; G01B 2290/15; G01B 2290/30; G01B 3/02; G01B 3/04; G01B 9/02029; G01B 9/02
See application file for complete search history.

(56) References Cited

U.S. PATENT DOCUMENTS

2006/0255300 A1\* 11/2006 Shakespeare ........ D21G 9/0027
250/559.37
2017/0059368 A1\* 3/2017 Holzapfel .......... G01D 5/34776

FOREIGN PATENT DOCUMENTS

EP 1382941 A1 1/2004
JP 2008151529 A 7/2008

\* cited by examiner

OPTICAL POSITION-MEASURING DEVICE

CROSS-REFERENCE TO PRIOR APPLICATION

Priority is claimed to German Patent Application No. DE 10 2016 211 150.7, filed on Jun. 22, 2016, the entire disclosure of which is hereby incorporated by reference herein.

FIELD

The present invention relates to an optical position-measuring device. This position-measuring device is capable of measuring the position of a first object relative to a second object.

BACKGROUND

A position-measuring system of this type is known, for example, from European Patent EP 0 470 291 B1. This position-measuring system is used for determining the position of a first object relative to a second object which is movable relative thereto along at least one measurement direction. This system is provided, on the one hand, with a scale connected to the first object and extending along the first measurement direction. The scale includes a measuring graduation composed of graduation regions which are alternately arranged along the measuring direction and have different optical properties. On the other hand, a scanning unit including at least one light source, a detector array and a fiber-optic array is connected to the second object. The fiber-optic array is composed of a plurality of optical fibers arranged adjacent one another, whose image-input faces face the scale and whose image-output faces face the detector array. As a result of the interaction of the beams emitted by the light source with the measuring graduation, a light pattern is produced which is transmitted by the fiber-optic array into a detection plane of the detector array. Using the detector array, position-dependent signals regarding the position of the two relatively movable objects can be generated from the detected light pattern and transmitted to subsequent electronics.

A position-measuring device of this kind makes it possible in a machine, for example, to determine the position of a movable machine component relative to a machine frame which is stationary with respect thereto. Thus, the movable machine component on the one hand, and the stationary machine frame on the other hand, act as the two relatively movable objects here. The subsequent electronics used is a higher-level machine controller, which uses the generated position-dependent signals for positioning the movable machine component, for example.

SUMMARY

In an embodiment, the present invention provides an optical position-measuring device for determining the position of a first object relative to a second object which is movable relative to the first object along at least one measurement direction. A scale is connected to the first object and extends along the measurement direction. The scale includes at least one measuring graduation composed of graduation regions which are alternately arranged along the measuring direction and have different optical properties. A scanner is connected to the second object and includes at least one light source, a detector array and at least one fiber-optic array including a plurality of optical fibers arranged adjacent one another. The fiber-optic array is configured as a fiber-optic plate having an image-input face that faces the scale and an image-output face that faces the detector array. A light pattern results from interaction of beams emitted by the light source with the measuring graduation. The fiber-optic array transmits the light pattern into a detection plane of the detector array. An interstitial medium is disposed between the image-output face of the fiber-optic plate and the detector array so as to ensure that an amount of deflection that the beams exiting the image-output face undergo on a path to the detector array is smaller than in a case without the interstitial medium.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
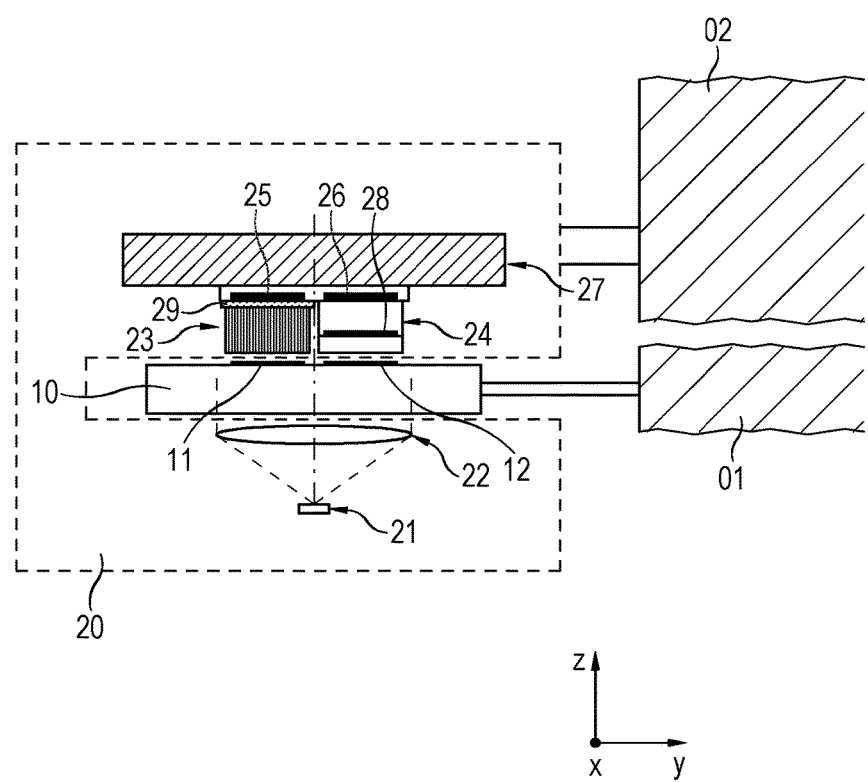
FIG. 1 is a highly schematic cross-sectional view of an exemplary embodiment of the optical position-measuring device according to the present invention.

In an exemplary embodiment of the cited document EP 0 470 291 B1, the fiber-optic array is configured as a lens package including a plurality of rod lenses. This lens package has a magnification ratio of 1:1 and serves to image the light pattern resulting from scanning of an absolutely coded code track into an image plane which constitutes the detection plane of a detector array. However, the proposed arrangement of the individual components has been recognized by the inventors to be not optimal with respect to imaging the light pattern with highest possible contrast into the detection plane. The inventors have discovered that, as a result of reflections occurring at various interfaces, unwanted scattered light is produced, which negatively affects the quality of the generated position-dependent signals.

Moreover, as a result of the significant distortion of the rod lenses, the areas of the code track that are located near the lateral surfaces of the code track are poorly imaged, resulting in position errors of the generated position-dependent signals in the pattern of the rod lenses. These position errors are not acceptable for high-precision position-measuring devices.

Another disadvantage recognized by the inventors arises from the great length of the rod lenses needed for a required magnification ratio of $A=1$. Such rod lenses typically have a length of 4-6 mm, and therefore do not enable a compact size for the position-measuring device.

In an embodiment, the present invention provides an optical position-measuring device of the type mentioned above which ensures high-contrast imaging of the light pattern produced by optically scanning the measuring graduation into the detection plane of the detector array.

The optical position-measuring device according to the present invention is used for determining the position of a first object relative to a second object which is movable relative thereto along at least one measurement direction. The position-measuring device includes a scale connected to the first object and extending along the measurement direction, the scale having at least one measuring graduation composed of graduation regions which are alternately arranged along the measuring direction and have different optical properties. Also provided is a scanning unit which is connected to the second object and includes at least one light source, a detector array and at least one fiber-optic array composed of a plurality of optical fibers arranged adjacent one another, whose image-input faces face the scale and whose image-output faces face the detector array. As a result of the interaction of the beams emitted by the light source with the measuring graduation, a light pattern is produced which is transmitted by the fiber-optic array into a detection plane of the detector array. The fiber-optic array is configured as a fiber-optic plate, and an interstitial medium is disposed between the image-output face of the fiber-optic plate and the detector array, the interstitial medium ensuring that the amount of deflection that the beams exiting the image-output face undergo on their path to the detector array is smaller than in the case without an interstitial medium.

Preferably, the interstitial medium has a refractive index within the following range: where $n_{ZM}$:=refractive index of the interstitial medium.

Furthermore, it may be provided that the thickness of the interstitial medium is within the following range:

$$5\ \mu m < d_{ZM} < 100\ \mu m$$

where $d_{ZM}$:=thickness of the interstitial medium.

Advantageously, an adhesive is provided as the interstitial medium.

Moreover, it is possible that the thickness of the fiber-optic plate is within the following range:

$$2 \cdot d_x < d_{FP} < d x / 4 \cdot \rho$$

where $d_{FP}$:=thickness of the fiber-optic plate $d_x$:=period of a periodic measuring graduation or minimum structure width of an aperiodic measuring graduation along the measurement direction $\rho$:=distortion factor of the fiber-optic plate, which corresponds to the lateral displacement relative to the fiber length, which arises between the image-input face and the image-output face of the fiber-optic plate during the transmission of the light pattern therethrough.

Furthermore, it may be provided that
the detector array is composed of individual detector elements arranged periodically along the measurement direction in the pattern of a defined detector periodicity, and
the optical fibers in the fiber-optic plate are arranged along the measurement direction in a periodic pattern having a first fiber optic periodicity, for which the following relation holds:

$$P_{FPx} \leq P_{DET}$$

where $P_{FPx}$:=first fiber optic periodicity along measurement direction x $P_{DET}$:=detector periodicity along measurement direction x In addition, it is possible that the optical fibers in the fiber-optic plate are arranged along a direction perpendicular to the measurement direction in a periodic pattern having a second fiber optic periodicity, for which the following relation holds:

$$P_{FPy} = P_{FPx}$$

where $P_{FPx}$:=first fiber optic periodicity along the measurement direction $P_{FPy}$:=second fiber optic periodicity along a direction perpendicular to the measurement direction Moreover, it may be provided that the following relation holds for the distance between the measuring graduation and the image-input face of the fiber-optic plate:

$$d_{MBE} \leq 200\ \mu m$$

where $d_{MBE}$:=distance between the measuring graduation and the image-input face.

In a possible variant, the fiber-optic plate has a cross-sectional shape of a rectangle whose longitudinal axis extends parallel to the measurement direction.

Finally, a glass medium may be disposed between the optical fibers in the fiber-optic plate, the glass medium absorbing light that does not contribute to signal generation.

Furthermore, it may be provided that the measuring graduation is configured as an absolute measuring graduation having an aperiodic code for absolute position determination, and that the detector array is configured as an absolute detector array for detecting the aperiodic light pattern transferred by the absolute measuring graduation.

An additional measuring graduation in the form of an incremental graduation may be provided on the scale parallel to the absolute measuring graduation, and by optically scanning the incremental graduation, a periodic light pattern is produced in the detection plane, where it can be detected by an incremental detector array.

Furthermore, the incremental graduation may take the form of an amplitude grating, and, for purposes of optically scanning the incremental graduation, a scanning grating in the form of a transmission-type scanning grating or a phase grating may be disposed between the incremental graduation and the incremental detector array.

Preferably, the following relations hold for the period of the incremental graduation and the periodicity of the light pattern resulting in the detection plane:

$$d_1 = d_2 \cdot (u+v)/v$$

$$d_3 = d_2 \cdot (u+v)/u$$

where $d_1$:=period of the incremental graduation $d_2$:=effective period of the scanning grating $d_3$:=periodicity of the light pattern resulting in the detection plane u:=distance between the incremental graduation and the scanning grating v:=distance between the scanning grating and the detection plane The optical position-measuring device of the present invention has the advantage of ensuring, through the inventive measures, that the light pattern can be imaged into the detection plane with particularly high contrast, thereby ensuring good quality of the position-dependent signals.

Refractive index steps between different media in the imaging beam path can be avoided. Less unwanted reflections occur at interfaces, as a result of which less interfering scattered light is produced.

Moreover, in accordance with the present invention, a particularly compact and contamination-resistant design can be achieved for the scanning portion of the system, in particular when scanning an absolutely coded measuring graduation using a fiber-optic array in the form of a fiber-optic plate.

In addition, the light pattern is imaged almost with distortion into the detection plane, making it possible to generate highly accurate position-dependent signals.

In FIG. 1, an exemplary embodiment of the position-measuring device according to the present invention is shown in schematic cross-sectional view; further details of this device are shown the following FIGS. 2-5. The exemplary embodiment will now be described with reference to the various figures.

The optical position-measuring device according to the present invention is used for determining the position of a first object O1 relative to a second object O2 which is movable relative thereto along at least one measurement direction. One of the objects O1, for example, a first machine component, is connected to the position-measuring device's scale 10, which extends along measurement direction x. The other object O2, such as a second machine component, is movable relative to the first machine component along measurement direction x and is connected to scanning unit 20 of the position-measuring device. The present exemplary embodiment provides for relative movement of the two objects O1, O2 along a linear measurement direction x, which in FIG. 1 is oriented perpendicular to the plane of the drawing.

Using the inventive position-measuring device, position-dependent signals with respect to the position of the two relatively movable objects O1, O2 and the respective machine components can be generated by optically scanning scale 10 and be sent to subsequent electronics. The subsequent electronics may, for example, be a higher-level machine controller, which uses the position-dependent signals for positioning the movable machine components.

Figure 2:
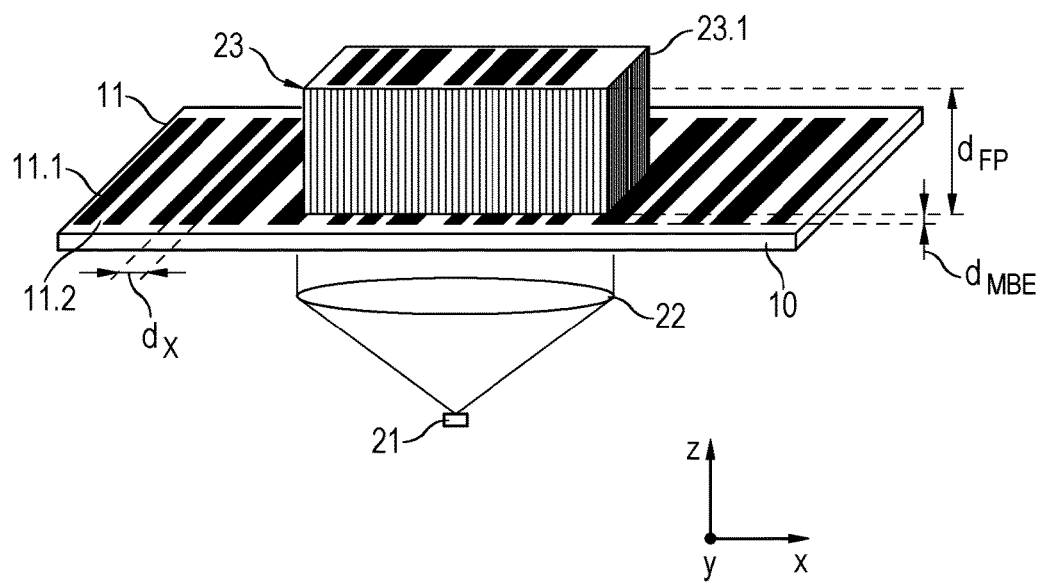
FIG. 2 is an enlarged three-dimensional view of a portion of the optical position-measuring device of FIG. 1.

Scale 10 is composed of a transparent carrier substrate, for example, of glass. In the present exemplary embodiment, two measuring graduations 11, 12 are arranged on the top side of the carrier substrate. Measuring graduations 11, 12 are formed by rectangular graduation regions 11.1, 11.2 arranged along measurement direction x and having different optical properties, as shown in FIG. 2 for first measuring graduation 11. In the illustrated exemplary embodiment, opaque graduation regions 11.1, for example, of chromium, and transparent graduation regions 11.2 are provided in measuring graduation 11. Thus, in this exemplary embodiment of the inventive position-measuring device, measuring graduations 11, 12 are scanned using the transmitted light method.

As can be seen from the detail view in FIG. 2, first measuring graduation 11 has an aperiodic code along measurement direction x, which is suitable for absolute position determination. Therefore, first measuring graduation 11 will also be referred to as absolutely coded measuring graduation or absolute measuring graduation hereinafter. The aperiodic code of this measuring graduation 11 may be in the form of a pseudo-random code (PRC).

Also provided in the exemplary embodiment shown is a second measuring graduation 12 which is arranged parallel to measuring graduation 11 and takes the form of an incremental graduation or incremental measuring graduation and which includes a periodic array of different graduation regions along measurement direction x. In the present case, incremental measuring graduation 12 is configured on the carrier substrate as an amplitude grating and includes periodically alternately arranged opaque and transparent graduation regions, which are also rectangular in shape.

In the position-measuring device according to the present invention, coarse absolute position information is obtained by optically scanning the absolute measuring graduation and arithmetically combined with the high-resolution incremental information obtained by optically scanning the incremental graduation. Thus, high-resolution absolute position information with respect to the position of the two objects O1, O2 (i.e., corresponding position-dependent signals) is available at the output for further processing.

In the position-measuring device according to the present invention, the other components required for transmitted-light optical scanning of scale 10 or the two measuring graduations 11, 12 and for generating the position-dependent signals are disposed in scanning unit 20. These components include light source 21, which is disposed on one side of scale 10 and takes the form of, for example, a light-emitting diode (LED) and which emits radiation having a wavelength of 850 nm and is used here for scanning the two measuring graduations 11, 12. A collimating optic 22 is placed in front of light source 21 in the direction of beam propagation to collimate the beams emitted by light source 21 toward scale 10. Other components serving for optically scanning the two measuring graduations 11, 12 and generating the position-dependent signals are disposed on the opposite side of scale 10.

For purposes of scanning measuring graduation 11, which is in the form of an absolute measuring graduation, a fiber-optic array 23 and a detector array 25 in the form of an absolute detector array are disposed in scanning unit 20. This detector array 25 is composed of individual detector elements 25.1 arranged periodically along measurement direction x. Detector array 25 is placed on a carrier element 27, such as a suitable circuit board.

A reticle plate 24 having an integrated scanning grating 28 in the form of a transmission-type scanning grating, as well as a further detector array 26, configured as an incremental detector array, are provided in scanning unit 20 for the scanning further measuring graduation 12, which is in the form of an incremental graduation. The incremental detector array is also placed on carrier element 27. Preferably, the absolute detector array and the incremental detector array are integrated into a sensor ASIC mounted on carrier element 27. The acquired signals may be subjected to a first processing step already in the sensor ASIC before they are transmitted to subsequent electronics.

In the position-measuring device according to the present invention, various measures are essential in connection with the scanning of first measuring graduation 11, which is configured as an absolute measuring graduation. These measures will be described in detail below. The scanning of the second, incremental measuring graduation 12 provided in this example will be discussed thereafter.

Optical scanning of absolutely coded measuring graduation 11 always requires that the light pattern resulting from the interaction of the beams emitted by light source 21 with measuring graduation 11 be transferred into the detection plane of detector array 25. Due to the aperiodic code of the measuring graduation 11 configured as an absolute measuring graduation, the light pattern produced when scanning the same is also aperiodic. In the following, "$d_x$" will be used to designate the minimum structure width of aperiodic measuring graduation 11.

Figure 3:
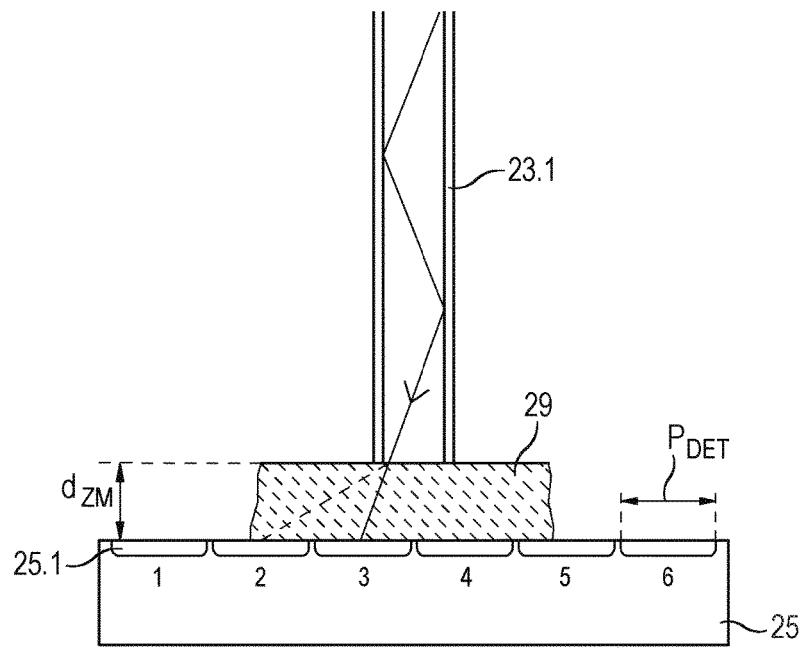
FIG. 3 is another enlarged view showing a portion of the position-measuring device of FIG. 1 to illustrate the optical effect of a suitably selected interstitial medium.
Figure 3:
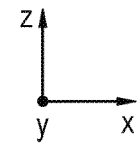
Figure 4:
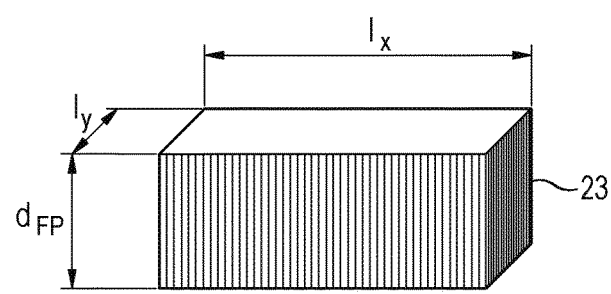
FIG. 4 is another enlarged view showing a portion of the position-measuring device of FIG. 1 to illustrate suitable dimensioning rules for the fiber-optic plate.
Figure 4:
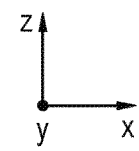
Figure 5:
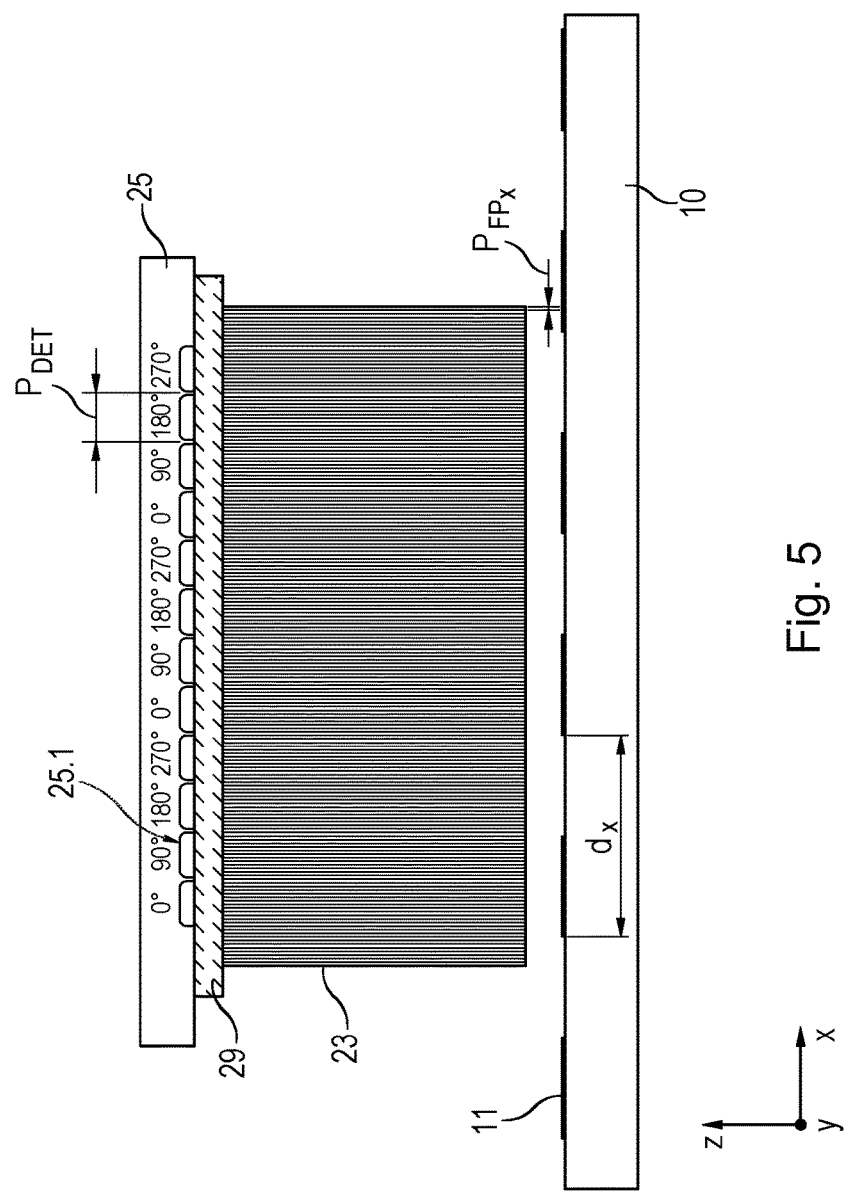
FIG. 5 is another enlarged view showing a portion of the position-measuring device of FIG. 1 to illustrate additional suitable dimensioning rules for the fiber-optic plate.

The detector array 25 provided for scanning the absolutely coded measuring graduation 11 is configured as an absolute detector array and, in the present exemplary embodiment, is composed of individual detector elements 25.1 arranged periodically along measurement direction x, as can be seen, for example, in the detail views of FIGS. 3 and 5. Detector elements 25.1 are arranged along measurement direction x in the pattern of a defined detector periodicity, hereinafter denoted as $P_{DET}$.

Fiber-optic array 23, which is configured as a fiber-optic plate and composed of a plurality of optical fibers 23.1 arranged adjacent one another, as can be seen, for example, in FIG. 2, serves to transmit the light pattern into the detection plane of detector array 25. In practice, such fiber-optic plates include bundles of optical fibers 23.1 which are fused together, cut to form a plane-parallel plate, and ground. Such fiber-optic plates are commercially available under the designation "Fiber Optic Faceplates" from the company SCHOTT AG, Mainz, for example.

In the position-measuring device according to the present invention, the image-input faces of the individual optical fibers 23.1 face the scale 10; i.e., the scanned measuring graduation 11, while the image-output faces face the associated detector array 25. As can also be seen from FIG. 2, the fiber-optic plate has a thickness $d_{FP}$ along the indicated z-direction and has a cross-sectional shape of a rectangle whose longitudinal axis extends parallel to measurement direction x.

Thickness $d_{FP}$ of fiber-optic plate 23 is preferably selected to be in the following range:

$$2 \cdot d_x < d_{FP} < d_x/4 \cdot \rho \qquad \text{(equation 1)}$$

where
$d_{FP}$:=thickness of the fiber-optic plate
$d_x$:=period of a periodic measuring graduation or minimum structure width of an aperiodic measuring graduation along the measurement direction
$\rho$:=distortion factor of the fiber-optic plate, which corresponds to the lateral displacement relative to the fiber length, which arises between the image-input face and the image-output face of the fiber-optic plate during the transmission of the light pattern therethrough.

With respect to the minimum thickness $d_{FP}$ of the fiber-optic plate, it is advantageous to maintain a certain minimum distance between the metallic chromium structures of measuring graduation 11 and the sensitive components of detector array 25 or of the respective ASIC. By maintaining such a minimum distance, it is possible to prevent the components from being damaged in the event that the metallic structures of measuring graduation 11 become electrically charged during operation.

With respect to the maximum allowable thickness $d_{FP}$ of the fiber-optic plate, consideration must be given to the fact that, typically, the greater the thickness of this component, the greater the distortion it produces in the light pattern it transmits. Such distortion results from the unavoidable torsion and twisting of optical fibers 23.1 during the manufacture of the fiber-optic plate. Accordingly, in order to ensure that light pattern is transmitted through the fiber-optic plate with the least possible distortion, the fiber-optic plate should not exceed a certain maximum allowable thickness $d_{FP}$ which, as indicated above, is related to the distortion factor $\rho$ of the respective fiber-optic plate.

Given typical values for the minimum structure width dx=220 μm of a measuring graduation 11 configured as an aperiodic code track and a distortion factor $\rho$=10 μm/mm, an advantageous range of between 440 μm and 5.5 mm is obtained for the thickness $d_{FP}$ of the fiber-optic plate using the above equation 1. Typical values for the length $l_x$ of the fiber-optic plate along measurement direction x and its length $l_y$ perpendicular thereto are $l_x$=5-10 mm and $l_y$=1-3 mm.

Thus, the fiber-optic plate transmits the light pattern on the input side into the detection plane of detector array 25 with an image-transfer ratio of 1:1 or a magnification ratio of A=1. The light pattern, which is used for generating position-dependent signal, is preferably not magnified or minified and not distorted in the process.

In the exemplary embodiment shown, the fiber-optic plate is used only for scanning the absolutely coded measuring graduation 11; i.e., only for transmitting the aperiodic light pattern into the detection plane of detector array 25. In the present case, the scanning of the incremental measuring graduation 12 on the scale is done using a scanning method which will be described below and which does not require such a fiber-optic plate. It should be expressly noted at this point that the fiber-optic plate could in principle also be used for scanning a periodic incremental measuring graduation. In this case, the variable $d_x$ in the above equation 1 would then designate the period of the scanned incremental measuring graduation instead of the minimum structure width.

With respect to the positioning of the fiber-optic plate relative to measuring graduation 11, it is further advantageous if the distance $d_{MBE}$ between measuring graduation 11 and the image-input face of the fiber-optic plate is selected as $$d_{MBE} \leq 200 \text{ μm} \qquad \text{(equation 2)}$$

By keeping the distance $d_{MBE}$ to a minimum, it is achieved that any droplet-type contamination that may be present on measuring graduation 11 is reduced in its height and thus in its interfering effect on the optical scanning. Therefore, $d_{MBE}$ is preferably selected as $d_{MBE} \leq 100$ μm, and ideally as $d_{MBE} \leq 50$ μm.

Another available design parameter for fiber-optic array 23; i.e., the fiber-optic plate, is the fiber optic periodicity; i.e., the pattern in which the individual optical fibers 23.1 are arranged. First, only the periodicity of the array of optical fibers 23.1 along measurement direction x will be discussed, which will be referred to as first fiber optic periodicity $P_{FPx}$ hereinafter. It is advantageous for first fiber optic periodicity $P_{FPx}$ to be selected as $$P_{FPx} \leq P_{DET} \qquad \text{(equation 3)}$$

where
$P_{FPx}$:=first fiber optic periodicity along measurement direction x
$P_{DET}$:=detector periodicity along measurement direction x Accordingly, first fiber optic periodicity $P_{FPx}$ along measurement direction x should preferably be less than or equal to the detector periodicity $P_{DET}$ along measurement direction x, as can be seen from the detail view in FIG. 5. By observing this rule, it is ensured that the edges in the light pattern are transmitted into the detection plane with good quality; i.e., with high contrast.

The detector periodicity $P_{DET}$ to be selected depends basically on the type of the measuring graduation scanned, and thus on the type of light pattern transmitted.

For instance, in the case of an absolutely coded measuring graduation encoded in Manchester code, it is advantageous to use a total of eight detector elements 25.1 for scanning a bit of the respective pseudo-random code. Given a minimum structure width or bit width $d_x$, the required detector periodicity is then derived as $P_{DET}=d_x/8$. Thus, according to equation 3, it follows for first fiber optic periodicity $P_{FPx}$ that $P_{FPx} \leq d_x/8$. In the case that the absolutely coded measuring graduation scanned has a minimum structure width or bit width of $d_x=220$ μm, the resulting required detector periodicity is accordingly $P_{DET}=27.5$ μm, and it follows for first fiber optic periodicity $P_{FPx}$ that $P_{FPx} \leq 27.5$ μm.

However, if fiber-optic array 23; i.e., the fiber-optic plate, is used for scanning an incremental measuring graduation, and thus for transmitting a periodic light pattern, then, in the example of four detector elements required per period $d_x$ of the light pattern, it follows for the detector periodicity that $P_{DET}=d_x/4$. Using equation 3, first fiber optic periodicity $P_{FPx}$ is derived as $P_{FPx} \leq d_x/4$. In the case that an incremental measuring graduation is scanned and the light pattern has a periodicity $d_x=40$ μm, the resulting required detector periodicity is accordingly $P_{DET}=10$ μm, and it follows for first fiber optic periodicity $P_{FPx}$ that $P_{FPx} \leq 10$ μm.

As mentioned above, in the exemplary embodiment shown, the fiber-optic plate is rectangular in cross section. This means that another available design parameter for this component is a fiber optic periodicity along a direction y perpendicular to measurement direction x. In the following, the term "second fiber optic periodicity $P_{FPy}$" will be used in connection with this variable. It is generally advantageous for second fiber optic periodicity $P_{FPy}$ to be selected to be equal to first fiber optic periodicity $P_{FPx}$; i.e.:

$$P_{FPy}=P_{FPx} \quad \text{(equation 4)}$$

where
$P_{FPx}$:=first fiber optic periodicity along the measurement direction
$P_{FPy}$:=second fiber optic periodicity along a direction perpendicular to the measurement direction In the position-measuring device according to the present invention, an interstitial medium 29 is disposed in the region between the image-output face of the fiber-optic plate and detector array 25, as can be seen, in particular, in the detail views of FIGS. 3 and 5. Interstitial medium 29 ensures, in particular, that the amount of deflection that the beams exiting the image-output face of the fiber-optic plate undergo on their path to detector array 25 is smaller than in the case without an interstitial medium. This relationship is illustrated in the detail view of FIG. 3, which shows the image-output end of an individual optical fiber 23.1 of fiber-optic plate 23, interstitial medium 29 and detector array 25 including the individual light-sensitive detector elements 25.1. As is apparent from this view, the beam incident from above is only slightly deflected from its original direction in interstitial medium 29 (solid-line beam). Shown in dashed line to the left of the only slightly deflected beam is the case where no interstitial medium is disposed in the region between the image-output face and detector array 25. In this case, the beam would be significantly deflected in this region. As a result of such deflection, the beam would then not be incident on the detector element 25.1 designated by numeral 3, as in the undeflected case, but on the detector element 25.1 located to the left thereof, designated by numeral 2. With respect to the transmission of the light pattern, this would have the effect that the light pattern image captured by detector array 25 would have significantly less contrast, which would result in poorer quality of the signals obtained during scanning of the associated measuring graduation 11.

Filling of the region between the image-output face of fiber-optic array 23 in the form of the fiber-optic plate and detector array 25 with a suitable interstitial medium has the additional positive effect that the number of refractive index steps in this region can be reduced. This results in less reflections at interfaces, and thus also less scattered light, thus eliminating the need for complex reflective layers, which would otherwise be necessary.

A preferred material which may be used as an interstitial medium 29 is a transparent material whose refractive index $n_{ZM}$ is approximately within the following range: $1.3 < n_{ZM} < 2.3$. A fundamental goal in the selection of a suitable material for interstitial medium 29 is to choose a material whose reflective index is particularly well matched to the refractive index $n_{FK}$ of the core of optical fibers 23.1 of the fiber-optic plate and to the refractive index $n_{DET}$ of detector array 25. Particularly low reflections can be achieved, for example, when the refractive index is selected as $$n_{ZM}=\sqrt{n_{FK} \cdot n_{DET}} \quad \text{(equation 5)}$$

where $n_{ZM}$:=refractive index of the interstitial medium.
$n_{FK}$:=refractive index of the fiber core
$n_{DET}$:=refractive index of the detector array An example of a material that is suitable for this purpose is an adhesive having a refractive index $n_{ZM}$ in the suitable range. If an adhesive is used as an interstitial medium 29, then the adhesive it also used to fix the fiber-optic plate with respect to detector array 25.

With respect to the thickness $d_{ZM}$ of interstitial medium 29, it is advantageous if this thickness $d_{ZM}$ is selected within the following range:

$$5 \text{ μm} < d_{ZM} < 100 \text{ μm} \quad \text{(equation 6)}$$

The maximum thickness $d_{ZM}$ of interstitial medium 29 is limited by the optical crosstalk from an optical fiber 23.1 to adjacent detector elements 25.1 of detector array 25. The maximum thickness $d_{ZM}$ of interstitial medium 29 that is possible without the occurrence of such crosstalk can be estimated by the following considerations. It is assumed that the incident light does not impinge perpendicularly on the image-input face of an optical fiber 23.1, but at an incident angle γ, which is determined by the width w of the light source 21 used and the focal length f of collimation optic 22 and expressed as w/2f. It is further assumed that the refractive index $n_{ZM}$ of interstitial medium 29 is matched to the refractive index $n_{FK}$ of the fiber core. The light exiting the image-output face then impinges on detector array 25 at an exit angle of γ'=w/2f, resulting in a lateral displacement $x_d$ as compared to perpendicular incidence on detector array 25. By suitably selecting the thickness $d_{ZM}$ of interstitial medium 29, it is attempted to keep the displacement $x_d$ to a minimum. Moreover, if for light transmission with highest possible contrast, it is required that $x_d \leq P_{DET}$ and it holds that $x_d = \gamma' \cdot d_{ZM}$, then the following relationship is derived for the thickness $d_{ZM}$ of interstitial medium 29:

$$d_{ZM} \leq \frac{1}{\arcsin\left(\frac{1}{n_{FK}} \cdot \sin\gamma\right)} \cdot \frac{P_{DET}}{10} \quad \text{(equation 7)}$$

where
$d_{ZM}$:=thickness of the interstitial medium
$n_{FK}$:=refractive index of the fiber core γ:=angle of incidence on the image-input face
$P_{DET}$:=detector periodicity along measurement direction x The angle of incidence on the image-input face; i.e., variable γ, may vary depending on the system conditions. For instance, γ may be the maximum angle of divergence, and thus may be expressed as γ=w/2f. If the fiber-optic plate is intended to transmit very fine light patterns, such as, for example, an incremental graduation, then, due to the diffraction at the fine grating structures, variable γ is derived as γ=λ/$d_x$; where λ denotes the light wavelength and $d_x$ denotes the period of the incremental graduation. Furthermore, γ may also be the angle of incidence of the collimated light, and thus may correspond to the illumination angle.

For the parameters w=0.3 mm, f=6.5 mm, $n_{FK}$=1.8 and $P_{DET}$=27.5 μm, which are typically selected for illumination perpendicular to the plane of the scale (γ=w/2f), the maximum thickness $d_{ZM}$ of interstitial medium 29 is then derived as $d_{ZM}$≤215 μm using equation 7. Accordingly, $d_{ZM}$ is advantageously selected as $d_{ZM}$≤200 μm, and ideally as $d_{ZM}$≤100 μm, as indicated in equation 6.

The minimum thickness $d_{ZM}$ of interstitial medium 29 is limited by the arising mechanical stresses, which increase significantly for small thicknesses $d_{ZM}$ of the interstitial medium 29 between the fiber-optic plate and detector array 25. Such mechanical stresses occur in this region as a result of the differences in thermal expansion coefficient between the different materials; i.e., typically between silicon (detector array 25) and glass (fiber-optic plate). Therefore, the thickness of interstitial medium 29 should be selected such that the mechanical stresses between detector array 25 and the fiber-optic plate are limited by the low stiffness of interstitial medium 29 in order to prevent damage in this region.

In the illustrated exemplary embodiment of the inventive optical position-measuring device, as already mentioned above, provision is made for scanning also an incremental measuring graduation 12 in addition to scanning an absolutely coded measuring graduation 11. The incremental scanning produces high-resolution position information with respect to relative movement of the two relatively movable objects O1, O2 along measurement direction x. This information is then arithmetically combined with the with coarser-resolution position information from the scanning of the absolute measuring graduation. Incremental measuring graduation 12 is here in the form of an amplitude grating and is composed of transparent and opaque graduation regions arranged periodically along measurement direction x. The periodicity or period of incremental graduation 12 will be denoted as $d_1$ hereinafter.

Further, as can be seen in FIG. 1, a reticle plate 24 with an integrated scanning grating 28 in the form of a transmission-type scanning grating having a period $d_2$, as well as a further detector array 26 configured as an incremental detector array, are provided in scanning unit 20 for the scanning of incremental measuring graduation 12. As a result of the interaction of the light beams that pass through measuring graduation 12 with scanning grating 28, a periodic light pattern having the periodicity $d_3$ is produced in the detection plane of detector array 26, where it is detected by a periodic array of detector elements. The detector array 26 used for generating incremental signals is in the form of a so-called "structured photodetector," which includes a plurality of detector elements arranged periodically along measurement direction x.

In the case of a transmission-type scanning grating in the form of an amplitude grating or a phase grating with a phase shift of approximately 90°, the following relations hold for the various geometric variables of this scanning system:

$$d_1 = d_2 \cdot (u+v)/v \quad \text{(equation 8.1)}$$

$$d_3 = d_2 \cdot (u+v)/u \quad \text{(equation 8.2)}$$

where
$d_1$:=period of the incremental graduation
$d_2$:=effective period of the scanning grating
$d_3$:=periodicity of the light pattern resulting in the detection plane
u:=distance between the incremental graduation and the scanning grating
v:=distance between the scanning grating and the detection plane If a transmission-type scanning grating in the form of a phase grating with a phase shift of 180° is used, then period $d_2$ in equation 8.2 represents the effective grating period, which is expressed as $d_2 = 2 \cdot d_{2P}$, where $d_{2P}$ indicates the actual grating period of the phase grating.

With regard to the scanning principles used for generating incremental signals, reference is also made to the publication by R. M. Pettigrew entitled "Analysis of Grating Imaging and its Application to Displacement Metrology" in SPIE Vol. 36, 1$^{st}$ European Congress on Optics Applied to Metrology (1977), pp. 325-332.

In addition to the exemplary embodiment specifically described herein, other embodiments are, of course, possible within the scope of the present invention.

For instance, it is not at all essential that the scale scanned have two measuring graduations. For example, only one measuring graduation could be arranged in a corresponding track on a carrier substrate, such as, for example, a single absolutely coded measuring graduation.

It is also possible to combine an incremental measuring graduation and an absolutely coded measuring graduation into a combined measuring graduation, for example, by omitting individual graduation regions of the incremental measuring graduation to thereby superimpose an absolute code.

Moreover, not only position-measuring devices for measuring linear movements can be configured in accordance with the present invention, but also position-measuring devices for measuring relative rotary movements can be optimized accordingly.

Furthermore, the measuring graduation scanned may also be in the form of a phase grating with phase shift of either 90° or 180°.

It is also possible to use a fiber-optic plate which absorbs and suppresses the light components which are not guided in the individual optical fibers. Such unwanted light components may result from unavoidable entry of light between the optical fibers or from strongly oblique light beams which do not lie within the numerical aperture of the optical fibers. Such absorption of unwanted light components can be ensured by an absorbing glass medium between the optical fibers, which absorbs light that does not contribute to signal generation. Interfering scattered light can be suppressed particularly well in this way.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for determining the position of a first object relative to a second object which is movable relative to the first object along at least one measurement direction, the optical position-measuring device comprising:
   a scale connected to the first object and extending along the measurement direction, the scale including at least one measuring graduation composed of graduation regions which are alternately arranged along the measuring direction and have different optical properties; and
   a scanner connected to the second object and including at least one light source, a detector array and at least one fiber-optic array including a plurality of optical fibers arranged adjacent one another, the fiber-optic array being configured as a fiber-optic plate having an image-input face that faces the scale and an image-output face that faces the detector array;
   a light pattern resulting from interaction of beams emitted by the light source with the measuring graduation, the fiber-optic array transmitting the light pattern into a detection plane of the detector array; and
   an interstitial medium disposed between the image-output face of the fiber-optic plate and the detector array so as to ensure that an amount of deflection that the beams exiting the image-output face undergo on a path to the detector array is smaller than in a case without the interstitial medium.

2. The optical position-measuring device as recited in claim 1, wherein the interstitial medium has a refractive index ($n_{ZM}$) within the following range:

$$1.3 < n_{ZM} < 2.3$$

where $n_{ZM}$:=refractive index of the interstitial medium.

3. The optical position-measuring device as recited in claim 1, wherein a thickness ($d_{ZM}$) of the interstitial medium is within the following range:

$$5 \text{ μm} < d_{ZM} < 100 \text{ μm}$$

where $d_{ZM}$:=thickness of the interstitial medium.

4. The optical position-measuring device as recited in claim 1, wherein the interstitial medium is an adhesive.

5. The optical position-measuring device as recited in claim 1, wherein the thickness (dFP) of the fiber-optic plate is within the following range:

$$2 \cdot d_x < d_{FP} < d_x/4 \cdot \rho$$

where
$d_{FP}$:=thickness of the fiber-optic plate,
$d_x$:=period of a periodic measuring graduation or minimum structure width of an aperiodic measuring graduation along the measurement direction,
$\rho$:=distortion factor of the fiber-optic plate, which corresponds to lateral displacement relative to fiber length, which arises between the image-input face and the image-output face of the fiber-optic plate during the transmission of the light pattern therethrough.

6. The optical position-measuring device as recited in claim 1, wherein:
   the detector array is composed of individual detector elements arranged periodically along the measurement direction in the pattern of a defined detector periodicity (NET), and
   the optical fibers in the fiber-optic plate are arranged along the measurement direction in a periodic pattern having a first fiber optic periodicity ($P_{FPx}$), for which the following relation holds:

$$P_{FPx} \leq P_{DET}$$

where
$P_{FPx}$:=first fiber optic periodicity along measurement direction x
$P_{DET}$:=detector periodicity along measurement direction x.

7. The optical position-measuring device as recited in claim 6, wherein the optical fibers in the fiber-optic plate are arranged along a direction perpendicular to the measurement direction in a periodic pattern having a second fiber optic periodicity ($P_{FPy}$), for which the following relation holds:

$$P_{FPy} = P_{FPx}$$

where
$P_{FPx}$:=first fiber optic periodicity along the measurement direction,
$P_{FPy}$:=second fiber optic periodicity along the direction perpendicular to the measurement direction.

8. The optical position-measuring device as recited in claim 1, wherein the following relation holds for a distance ($d_{MBE}$) between the measuring graduation and the image-input face of the fiber-optic plate:

$$d_{MBE} \leq 200 \text{ μm}$$

where $d_{MBE}$:=distance between the measuring graduation and the image-input face.

9. The optical position-measuring device as recited in claim 1, wherein the fiber-optic plate has a cross-sectional shape of a rectangle whose longitudinal axis extends parallel to the measurement direction.

10. The optical position-measuring device as recited in claim 1, wherein a glass medium is disposed between the optical fibers in the fiber-optic plate, the glass medium absorbing light that does not contribute to signal generation.

11. The optical position-measuring device as recited in claim 1, wherein the measuring graduation is configured as an absolute measuring graduation having an aperiodic code for absolute position determination, and wherein the detector array is configured as an absolute detector array for detecting an aperiodic light pattern transferred by the absolute measuring graduation.

12. The optical position-measuring device as recited in claim 11, wherein an additional measuring graduation configured as an incremental graduation is provided on the scale (parallel to the absolute measuring graduation such that, by optically scanning the incremental graduation, a periodic light pattern is produced in the detection plane, where it is detectable by an incremental detector array.

13. The optical position-measuring device as recited in claim 11, wherein the incremental graduation is configured as an amplitude grating, and, for purposes of optically scanning the incremental graduation, a scanning grating configured as a transmission-type scanning grating or a phase grating is disposed between the incremental graduation and the incremental detector array.

14. The optical position-measuring device as recited in claim 13, wherein the following relations hold for a period ($d_1$) of the incremental graduation and a periodicity ($d_3$) of the light pattern resulting in the detection plane:

$$d_1 = d_2 \cdot (u+v)/v$$

$$d_3 = d_2 \cdot (u+v)/u$$

where
$d_1$:=period of the incremental graduation,
$d_2$:=effective period of the scanning grating,
$d_3$:=periodicity of the light pattern resulting in the detection plane,
u:=distance between the incremental graduation and the scanning grating,
v:=distance between the scanning grating and the detection plane.

* * * * *